(12) United States Patent
Ren et al.

(10) Patent No.: US 11,835,378 B2
(45) Date of Patent: Dec. 5, 2023

(54) AUTOMATIC LARGE-MASS-WEIGHT HANDLING SYSTEM

(71) Applicant: National Institute of Metrology, Beijing (CN)

(72) Inventors: Xiaoping Ren, Beijing (CN); Jian Wang, Beijing (CN); Changqing Cai, Beijing (CN); Tao Li, Shanghai (CN); Manhong Hu, Beijing (CN); Xiang Wang, Beijing (CN); Ping Chen, Shanghai (CN)

(73) Assignee: NATIONAL INSTITUTE OF METROLOGY, Beijing (CN)

( * ) Notice: Subject to any disclaimer, the term of this patent is extended or adjusted under 35 U.S.C. 154(b) by 72 days.

(21) Appl. No.: 16/344,816

(22) PCT Filed: Dec. 8, 2016

(86) PCT No.: PCT/CN2016/109034
§ 371 (c)(1),
(2) Date: Apr. 17, 2020

(87) PCT Pub. No.: WO2018/076473
PCT Pub. Date: May 3, 2018

(65) Prior Publication Data
US 2023/0194332 A1    Jun. 22, 2023

(30) Foreign Application Priority Data

Oct. 25, 2016  (CN) .......................... 201610940592.4

(51) Int. Cl.
*G01G 19/414*   (2006.01)
*G01G 21/16*    (2006.01)
*G01G 23/01*    (2006.01)

(52) U.S. Cl.
CPC ......... *G01G 19/4144* (2013.01); *G01G 21/16* (2013.01); *G01G 23/01* (2013.01)

(58) Field of Classification Search
CPC .... G01G 23/00; G01G 19/4144; G01G 21/16; G01G 1/00; G01G 23/01
See application file for complete search history.

(56) References Cited

U.S. PATENT DOCUMENTS

| | | | |
|---|---|---|---|
| 6,420,666 B1 | 7/2002 | Baumeler et al. | |
| 6,864,438 B2 * | 3/2005 | Weber | G01G 23/01 |
| | | | 177/253 |
| 8,178,799 B2 * | 5/2012 | Luchinger | G01G 17/04 |
| | | | 177/180 |

FOREIGN PATENT DOCUMENTS

| | | |
|---|---|---|
| CN | 101806612 A | 8/2010 |
| CN | 203274896 U | 11/2013 |

(Continued)

*Primary Examiner* — An H Do
(74) *Attorney, Agent, or Firm* — Hsuanyeh Law Group PC

(57) ABSTRACT

An automatic large-mass-weight handling system comprises: a weight picking device (10) configured for picking up and holding a large-mass-weight (75); a driving device (80) for providing a driving power; a weight transferring device (50) comprising a first horizontal rail (52) and a vertical rail (62) assembled to the first horizontal rail (52) in a way of being movable along the first horizontal rail (52), the first horizontal rail (52) extending in a first horizontal direction, the vertical rail (62) extending in a vertical direction perpendicular to the first horizontal direction, and the weight picking device (10) being assembled to the vertical rail (62); and a control unit for controlling the movement of the weight picking device (10); wherein the control unit controls the driving device (80) in a way that the weight picking device (10) is able to be moved automatically in the (Continued)

first horizontal direction and is able to be moved automatically in the vertical direction.

12 Claims, 3 Drawing Sheets

(56) References Cited

FOREIGN PATENT DOCUMENTS

| CN | 104870951 A | 8/2015 |
|----|-------------|--------|
| CN | 204643143 U | 9/2015 |
| CN | 105092009 A | 11/2015 |
| CN | 206114098 U | 4/2017 |
| CN | 202420653 U | 4/2019 |

* cited by examiner

AUTOMATIC LARGE-MASS-WEIGHT HANDLING SYSTEM

This is a U.S. national stage application under 35 U.S.C. § 371 of International Application No. PCT/CN2016/109034, filed on Dec. 8, 2016, which claims the benefit of priority to China Patent Application No. 201610940592.4, filed on Oct. 25, 2016. The entire contents of both applications are incorporated herein by reference for all purposes.

TECHNICAL FIELD

The invention relates to the technical field of mass metrology, and in particular, to a large-mass-weight accessing system.

BACKGROUND ART

High-precision standard mass weights are commonly used in mass metrology field for measuring the mass of lower-level (or lower-stage) weights. During mass measuring in which standard mass weights are used, standard mass weights are taken out from a large-mass-weight storing device and transported to a measuring site. The precision of the weights shall be ensured during the picking up and transporting of the standard mass weights. Dusts and moisture shall be prevented from adhered to surfaces of the weights, because which would otherwise results in changes in the mass values of the weights and thus negatively affects the usage stability of the weights so that they cannot be used in long term.

High precision standard mass weights cannot be handled by using ordinary lifting means because such operation may damage the surfaces of the weights and then affects the mass values of the weights. In particular, during mass measuring of a large-mass-weight, a plurality of standard mass weights shall be picked up and transported repetitively. If the handling operation in these cases is performed by ordinary hoisting manner, not only the operation efficiency is low, but also the weights may be damaged, and in addition, safety of persons cannot be guaranteed and components of other equipment may be damaged.

Thus, it is desired to solve the above problems.

SUMMARY OF THE INVENTION

An object of the invention is to provide a large-mass-weight storing device, a weight structure adapted to be stored in this large-mass-weight storing device, as well as a large-mass-weight handling module which provides convenience in handling large-mass-weights during normal operation.

The invention in a first aspect provides an automatic large-mass-weight handling system comprising: a weight picking device configured for picking up and holding a large-mass-weight; a driving device for providing driving power; a weight transferring device comprising a first horizontal rail and a vertical rail assembled to the first horizontal rail in a way of being movable along the first horizontal rail, the first horizontal rail extending in a first horizontal direction, the vertical rail extending in a vertical direction perpendicular to the first horizontal direction, and the weight picking device being assembled to the vertical rail; and a control unit for controlling the movement of the weight picking device; wherein the control unit controls the driving device in a way that the weight picking device is able to be moved automatically in the first horizontal direction and is able to be moved automatically in the vertical direction.

According to an embodiment, the automatic large-mass-weight handling system is an automatic handling system for large-mass-weights in the form of cylinders, and the weight picking device comprises a weight holding portion which is also rotatable around the vertical direction. According to an embodiment, the weight holding portion is in the form of an arm or a bar, and comprises a main body, a fixed end connected to the vertical rail, and a free end comprising the weight holding portion.

According to an embodiment, the weight holding portion comprises an generally U-shaped upper broader portion and a generally U-shaped lower narrower portion connected to the generally U-shaped upper broader portion, the generally U-shaped lower narrower portion having a dimension corresponding to the dimension of a corresponding holding portion of the weight to be picked up, and the generally U-shaped upper broader portion having a dimension corresponding to the outer diameter of the weight to be picked up.

According to an embodiment, the automatic large-mass-weight handling system is an automatic handling system for large-mass-weights in the form of cubes, and the weight picking device comprises a weight holding portion which is also movable in a second horizontal direction that is perpendicular to both the first horizontal direction and the vertical direction.

According to an embodiment, the weight picking device comprises a base and a plurality of teeth protruding from the base in the second horizontal direction, the plurality of teeth being configured to be inserted into corresponding mating grooves, which are formed in a support structure for storing the large-mass-weights, for picking up a weight and storing a weight.

According to an embodiment, the weight picking device is provided with a sensing device for indicating that the weight holding portion reaches a predetermined target position, the sensing device being adapted to be cooperative with a counter sensing device provided on a structure for supporting large-mass-weights.

According to an embodiment, the driving device comprises one or more electric motors.

According to an embodiment, the control unit comprises a user inputting device for receiving target position information which is inputted by a user.

According to an embodiment, the control unit comprises a memory device in which information of weight storage positions that the weight picking device can reach is stored.

According to an embodiment, the target position information inputted by a user and the information of the weight storage positions are each in the form of a two-dimensional coordinate representing each weight storage position or a weight number corresponding to the two-dimensional coordinate that represents each weight storage position.

According to an embodiment, the control unit comprises an actuating device which actuates the driving device according to the target position information inputted by a user and the information of the weight storage positions.

By using the automatic large-mass-weight handling system according to the invention, automatic picking up and transferring of large-mass-weights can be achieved without damaging or contaminating outer surfaces of the weights. Not only operation efficiency is high, but also manpower and material can be saved significantly.

The above summary and other features and advantages of the invention can be better understood from the detailed description in combination with the drawings. However, it should be understood that the drawings are not depicted in scale and are only given for illustrating the principle of the invention for the purpose of illustration and explanation. In the drawings, portions related with inventive features and advantages of the invention are shown in detail, and portions not related with the inventive features and advantages of the invention are omitted or simplified. Components, devices and structures which are not shown in the drawings may be included in the automatic large-mass-weight handling system of the invention. In the drawings:

DETAILED DESCRIPTION OF PREFERRED EMBODIMENTS

Automatic picking up and automatic transferring of large-mass-weights, especially high precision standard mass weights, as a particular type of weights, can be effected by means of an automatic large-mass-weight handling system according to the invention. When conditions permitted, a weight can be transferred to a large-mass-weight measuring device provided in the next lower stage. Of course, the weight may also be transferred to intermediate transport equipment, such as a transport vehicle. By using the automatic large-mass-weight handling system according to the invention, picking up a weight can be conducted in the condition that the surface of the weight is not damaged or contaminated, which is advantageous in guaranteeing the stability in long term usage of the weight. In addition, during transferring and transporting of the weights, weight loading and unloading can be performed without impact, at a high speed and in an automatic handling manner, so that manpower and material can both be saved and operation efficiency is high. The invention may have a great effect in the field of mass measuring, and in particular in the application in measuring a large-mass-weight of a lower stage by using a large-mass-weight of an upper stage.

A mass weight automatic handling system of the invention will be concretely described with reference to the drawings.

Figure 1:
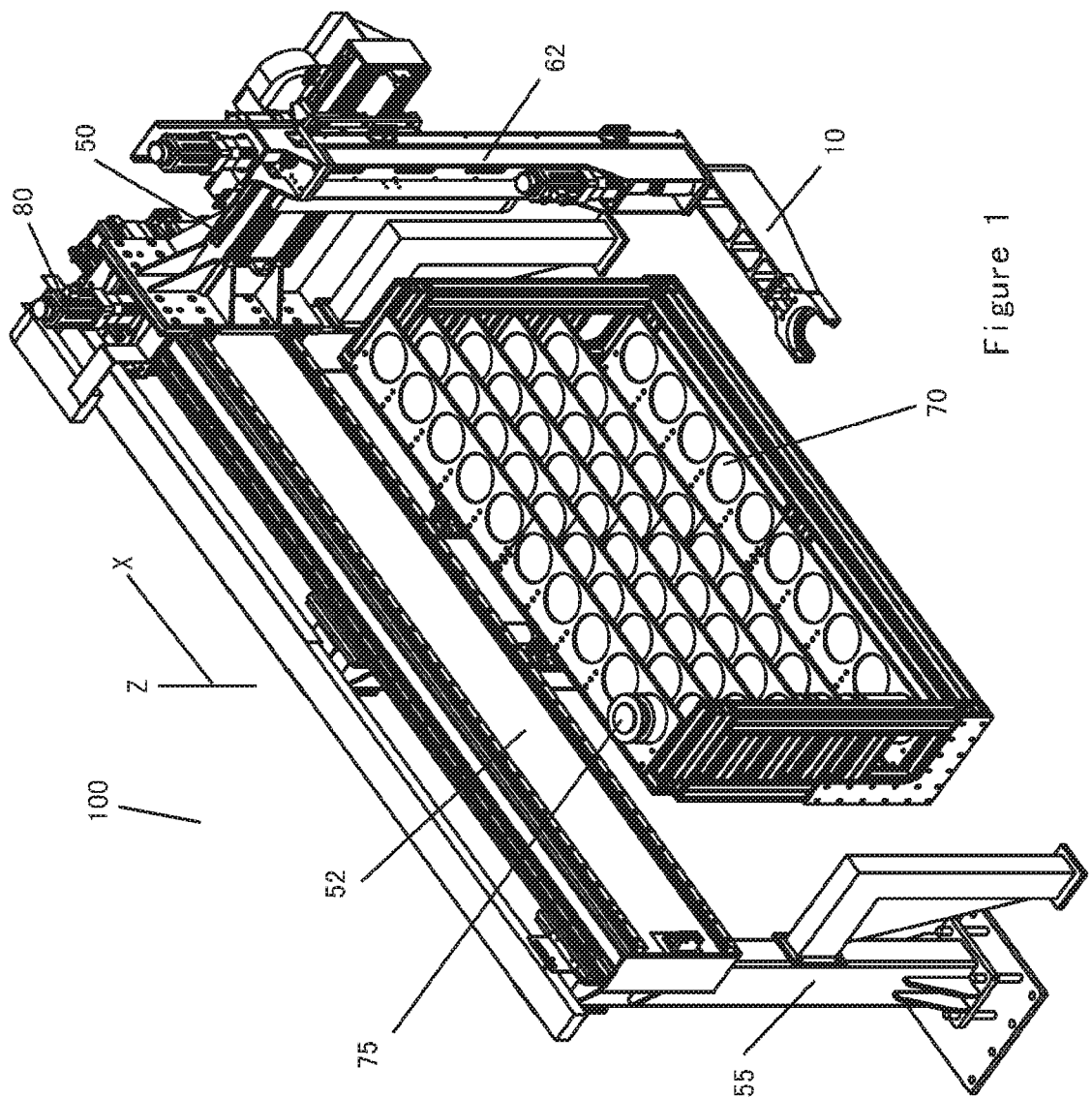
FIG. 1 is a simplified schematic view of an automatic handling system for large-mass-weights in the form of cylinders according to the invention.

In FIG. 1, an automatic large-mass-weight handling system 100 in general comprises a weight picking device 10 for picking up weights from a large-mass-weight storing device, a transferring device 50 for transferring the picked-up weights, a driving device 80 for driving the weight picking device 10 to move, and a control unit (not shown).

The weight picking device 10 has one end attached to the transferring device 50 and the other end comprising a weight holding portion adapted to pick up and hold a large-mass-weight, as will be further described in details with reference to the drawings.

The transferring device 50 is supported by a supporting frame 55 which is fixed to a wall and/or a ground surface, and mainly comprises an X-direction guide rail 52 supported by the supporting frame 55 and a vertical rail 62 that is movable along the X-direction guide rail 52. The weight picking device 10 is mounted to a bottom end of the vertical rail 62 and is movable in the vertical direction (which, for example, may be defined as Z direction) along the vertical rail 62. The X-direction guide rail 52 defines a first horizontal direction (which, for example, may be defined as X direction) that is perpendicular to the vertical direction.

Specifically, the transferring device 50 may comprise an X-direction sliding assembly assembled to the X-direction guide rail 52 and a vertical-direction sliding assembly assembled to the vertical rail 62. The vertical rail 62 may be assembled to a sliding assembly so that it is slidable in the X direction along the X-direction guide rail 52. One end of the weight picking device 10 may be attached to the vertical-direction sliding assembly so that the weight picking device 10 can be moved in the vertical direction with the vertical-direction sliding assembly.

Further, in the present invention, the weight picking device 10 is rotatable in a horizontal plane that is perpendicular to the vertical direction Z around the Z direction, for example, around the vertical rail 62, as shown in FIG. 1. Of course, as can be understood by those skilled in the art, only the weight holding portion of the weight picking device 10, instead of the whole weight picking device 10, may be provided to be rotatable around the Z direction.

The control unit of the automatic large-mass-weight handling system 100 may comprise an instruction inputting device, a memory device and a control unit.

Information of a plurality of target positions that can be reached by the weight holding portion of the weight picking device 10, that is also information of target positions where the large-mass-weights can be stored by means of the weight holding portion or information of original storage positions of the large-mass-weights that can be picked up by the weight holding portion, is stored in the memory device. Information of these positions is preferably in the form of an array, although any other proper forms may also be sued.

The large-mass-weight storing device that operates in cooperative with the automatic large-mass-weight handling system 100 shown in FIG. 1 is preferably in the form of a vertical array type storing device, which is represented by reference sign 70 in FIG. 1. The vertical array type storing device 70 comprises a plurality of supporting separation plates 72 which have, for example, a total number "m", arranged to be separate from each other in the vertical direction or the Z direction, and a plurality of large-mass-weights which have, for example, a total number "n", may be stored on each supporting separation plate 72 in the X direction which is perpendicular to the Z direction, so that a vertical array type (m×n) storing device is formed. On each supporting separation plate 72, weights 75 are arranged in the X direction. In the text below, term "row" indicates extending in the X direction, and "column" indicates extending in the vertical direction or in the Z direction.

In this case, as an example, in the memory device of the automatic large-mass-weight handling system 100, a two-dimensional coordinate composed by row and column values for representing each storage position in the vertical array type storing device can be stored, or a unique position code or number that represents the two-dimensional coordinate of each storage position can be stored. For example, the row value represents the concerned one of the supporting separation plates 72, and the column value represents the particular storage position on this supporting separation plate 72.

A user may input information of a target position where the weight holding portion is determined to reach via the instruction inputting device, for example, by designating a particular point in the coordinate array, such as inputting a two-dimensional coordinate or a position code that represents the desired weight storage position. According to the instruction inputted by the user via the instruction inputting device, the control unit controls the driving device 80 to drive the weight picking device 10, in particular the weight holding portion, to perform desired actions. These actions comprise one or more of the actions listed below: horizontal movement in the X direction, movement in the Z direction, rotation in a plane perpendicular to the Z direction, etc.

The driving device 80 generally comprises one or more electric motors, which may be a common motor that performs all the above actions or individual motors each performing one of the above actions. For example, in the illustrated example, the driving device 80 comprises a motor for X-direction movement and a motor for Z-direction movement on the X-direction guide rail 52 and the vertical rail 62 respectively and a motor for rotating the weight picking device 10 about the Z direction.

Preferably, on the weight picking device 10, for example, at the weight holding portion, there is provided with a sensing device, such as a sensor, for indicating that the weight holding portion has already reached the desired target position, the sensing device being aligned with a counter sensing device at the target position or being cooperative with the counter sensing device in other ways.

Figure 2:
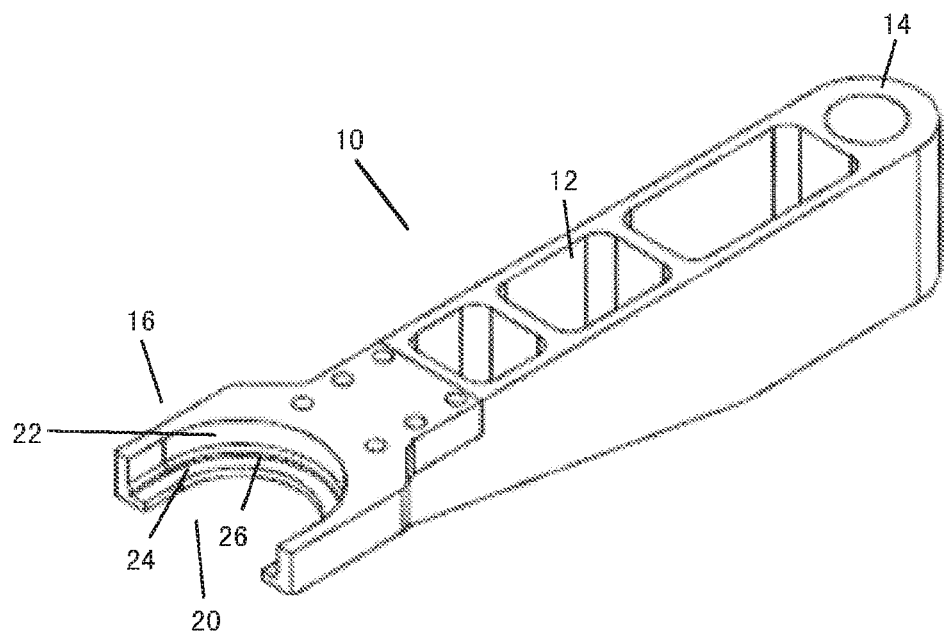
FIG. 2 is a perspective view of a weight picking device of the automatic large-mass-weight handling system shown in FIG. 1.

FIG. 2 shows a weight picking device 10 for weights having a cylindrical shape. The weight picking device 10 is in the form of an arm or a bar, which may be an integral piece or an assembly formed by attaching a plurality of parts together. The weight picking device 10 comprises a main body 12, a fixed end 14 connected to the transferring device 50, and an opposite free end 16 for picking up weights. At the free end 16, the weight holding portion 20 of the weight picking device 10 comprises a generally U-shaped broader portion 22 which is provided on an upper location and has a relatively larger internal size and a generally U-shaped narrower portion 24 which is under and continuous with the generally U-shaped broader portion 22 and has a relatively smaller internal size. In other words, in a horizontal cross section, the generally U-shaped broader portion 22 has a delimiting profile that is offset outwards from the delimiting profile of the generally U-shaped narrower portion 24 to define a transitional step 26 therebetween.

Figure 3:
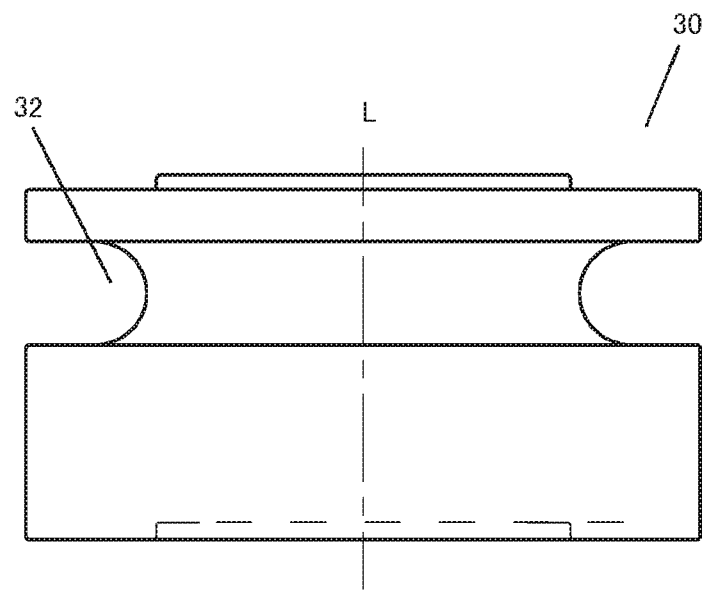
FIG. 3 is a schematic view of a cylindrical weight that can be handled by the automatic large-mass-weight handling system shown in FIG. 1.

Correspondingly, FIG. 3 shows a cylindrical weight that can be picked up by the picking device 10 shown in FIG. 2. It can be seen from FIG. 3 that the cylindrical weight 30 has a circular concave portion 32 that is recessed from the cylindrical outer surface of the cylindrical weight 30 at a location near the top end of it.

When the weight 30 shown in FIG. 3 is to be picked up by the picking device 10 shown in FIG. 2, the driving device 80 drives the picking device 10 to move, so that the generally U-shaped narrower portion 24 is moved into the concave portion 32 of the cylindrical weight 30 in a plane that is perpendicular to the central axis L of the cylindrical weight 30 to accomplish the holding of the weight 30. Then, the weight 30 is moved upwards along the central axis L of the cylindrical weight 30 to accomplish the out taking of the weight 30. Reversely, after the picking device 10 which holds the weight 30 puts the weight 30 into position, the storing of the weight 30 may be accomplished by an action of withdrawing the generally U-shaped narrower portion 24 out of the concave portion 32 of the cylindrical weight 30 in the plane that is perpendicular to the central axis L of the cylindrical weight 30.

In addition, optionally, the picking device 10 may be provided with a sensing device, for example, a sensor, for sensing and then determining the positional relation of the generally U-shaped narrower portion 24 of the picking device 10, in particular that at the free end 16, with respect to the storing device for the cylindrical weights 30, so that when picking up a weight 30, the generally U-shaped narrower portion 24 can precisely goes deep into the concave portion 32 of the cylindrical weight 30 without damaging the weight 30, or when storing a weight 30, the generally U-shaped narrower portion 24 can take the weight 30 to a desired storage position with high precision.

A weight picking device 100 for large-mass-weights in the form of cylinders has been described above. For a large-mass-weight in the form of a cylinder, the weight can be picked up or stored at any weight storage position in the large-mass-weight storing device 70 shown in FIG. 1 by moving the weight picking device 10, for example, the weight holding portion, to any desired target position via one or combined two or three actions of: moving in the X direction, moving in the Z direction, and rotating around the Z direction. However, according to real need, the automatic large-mass-weight handling system 100 may additionally comprise a guide rail arranged in a second horizontal direction (which, for example, may be defined as Y direction) which is perpendicular to both the X direction and the Z direction, so that the weight picking device 10 is also movable in the Y direction.

Figure 4:
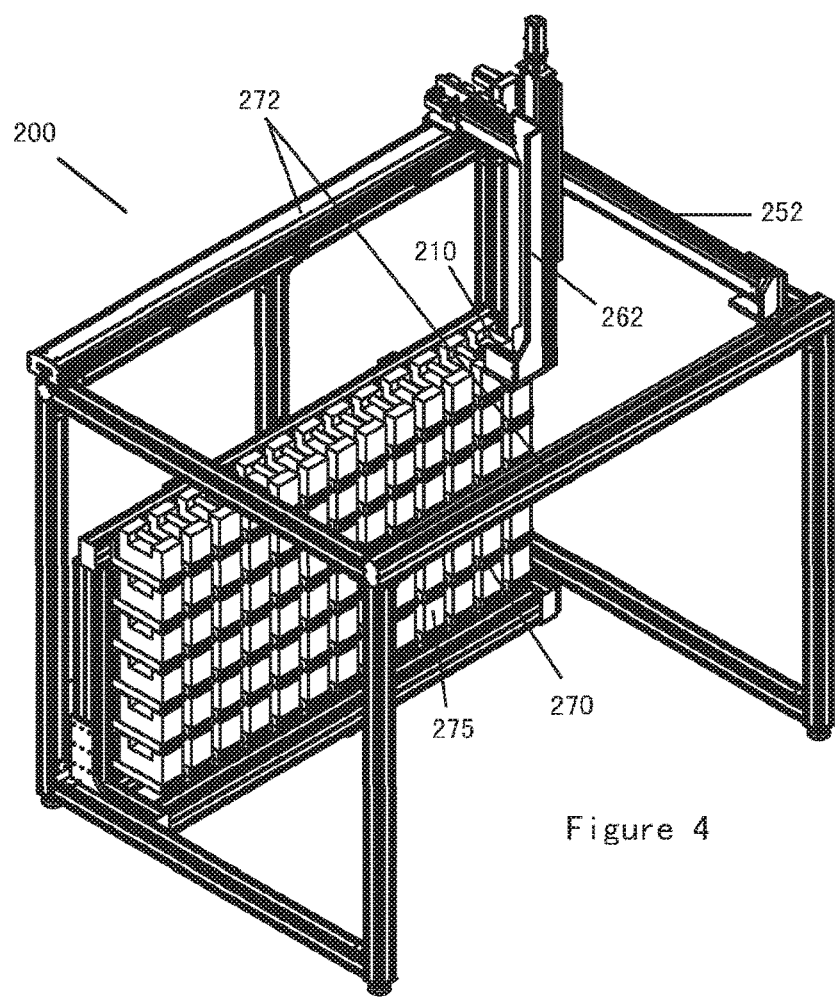
FIG. 4 is a simplified schematic view of an automatic handling system for large-mass-weights in the form of cubes according to the invention.

FIG. 4 shows an automatic handling system 200 for large-mass-weights in the form of cubes, the automatic handling system 200 comprising three guide rails, an X-direction guide rail 252, a Y-direction guide rail 272 and a vertical rail 262. In the present embodiment, the weight picking device 210 can reach any weight storage position in a weight storing device 270 for the large-mass-weights in the form of cubes via one or combined two or three actions of: moving in the X direction along the X-direction guide rail 252, moving in the Y direction along the Y-direction guide rail 272, and moving in the vertical direction along the vertical rail 262.

The Y-direction guide rail 272 of the automatic large-mass-weight handling system 200 is fixed to a wall and/or a ground surface directly or indirectly. The X-direction guide rail 252 is attached to the Y-direction guide rail 272 by means of a Y-direction sliding assembly, the vertical rail 262 is attached to the X-direction guide rail 252 by means of an X-direction sliding assembly, and the weight picking device 210 is assembled to a vertical sliding assembly of the vertical rail 262, so that the weight picking device 210 is movable in the X direction, the Y direction and the vertical direction respectively. Optionally, as in the embodiment shown in FIG. 1, a driving device (not shown) may comprise a common electric motor for achieving movements in all the three directions or three electric motors for achieving movements in the X direction, the Y direction and the vertical direction respectively.

In addition to substituting the rotation around the Z direction performed by the weight picking device shown in FIG. 1 with movement in the Y direction, the embodiment shown in FIG. 4 is also distinguished from that shown in FIG. 1 in the structure of the weight picking device 10.

Different from the weight picking device 10 shown in FIG. 2, the weight picking device 210 for cubic-shaped large-mass-weights in the present embodiment is configured to have a weight holding portion therein. A concrete structure is shown in details in FIG. 5.

Figure 5:
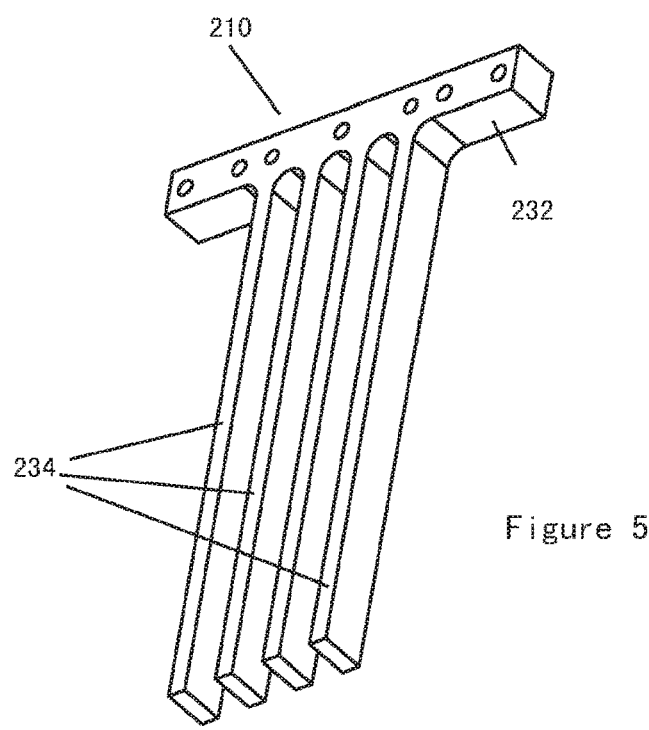
FIG. 5 is a perspective view of a weight picking device of the automatic large-mass-weight handling system shown in FIG. 4.

In FIG. 5, the weight picking device 210 in which a weight holding portion is formed comprises a base 232 and a plurality of teeth 234, for example, at least two teeth 234, protruding from the base 232. For example, optionally, three, four, five, six or more teeth may be provided. When picking up a cubic weight 275 from the large-mass-weight storing device 270, the teeth 234 of the weight picking device 210 are driven by the driving device to insert into grooves formed under the stored cubic weight 275 and then lift the weight. When the storing device 270 stores a cubic weight 275, the weight picking device 210 which carries the cubic weight 275 is lowered down to a desired storage area, the teeth 234 are lowered into the grooves, and then the teeth 234 of the weight picking device 210 are withdrawn in a horizontal direction (the X direction as illustrated), so the storage operation is finished.

The automatic large-mass-weight handling system according to the invention is described above with reference to two different types of large-mass-weights. Automatic handling of large-mass-weights is achieved, so manpower and material can both be saved. In addition, thanks for automatic handling controlled under a computer, weight loading and unloading precision is very high, so damages to the outer surface of the weight is avoided, which is of significance to high precision standard mass weights. As a result, usage stability and precision of high precision standard mass weights can be improved.

Of course, in the present invention, "large-mass-weight" is not limited to a high precision standard mass weight; rather, it means any weight that has characteristics of having a large mass and being inconvenient in loading and handling. For simple and convenient description, sometimes only "weight" is used here.

While some preferred embodiments of the invention have been described as above, the invention is not intended to be limited to the embodiments described above and shown in the drawings. Features described with reference to one embodiment are also applicable to other embodiments of the invention, and features of different embodiments can be combined to form new embodiments. Various modifications and variants can be made to the above embodiments by the skilled in the art without departing from the spirit and scope of the invention defined by the following claims.

The invention claimed is:

1. An automatic large-mass-weight handling system used with a vertical array type storing device for large-mass-weights, wherein the vertical array type storing device comprises a plurality of supporting separation plates which are arranged to be separated from each other in a vertical direction, on each of the supporting separation plates a plurality of large-mass-weights can be stored in a first horizontal direction which is perpendicular to the vertical direction, and the automatic large-mass-weight handling system comprises:
a weight picking device configured for picking up and holding a large-mass-weight;
a driving device for providing driving power;
a weight transferring device comprising a first horizontal rail and a vertical rail assembled to the first horizontal rail in a way of being movable along the first horizontal rail, the first horizontal rail extending in the first horizontal direction, the vertical rail extending in the vertical direction perpendicular to the first horizontal direction, and the weight picking device being assembled to the vertical rail; and
a control unit for controlling the movement of the weight picking device;
wherein the control unit controls the driving device in a way that the weight picking device is able to be moved automatically in the first horizontal direction and is able to be moved automatically in the vertical direction, so that each large-mass-weight of the plurality of large-mass-weights can be stored into or take out of its position on the corresponding supporting separation plate along a second horizontal direction perpendicular to the first horizontal direction and the vertical direction.

2. The automatic large-mass-weight handling system according to claim 1, wherein the automatic large-mass-weight handling system is an automatic handling system for large-mass-weights in the form of cylinders, and the weight picking device comprises a weight holding portion which is also rotatable around the vertical direction.

3. The automatic large-mass-weight handling system according to claim 2, wherein the weight holding portion is in the form of an arm or a bar, and comprises a main body, a fixed end connected to the vertical rail, and a free end comprising the weight holding portion.

4. The automatic large-mass-weight handling system according to claim 3, wherein the weight holding portion comprises an generally U-shaped upper broader portion and a generally U-shaped lower narrower portion connected to the generally U-shaped upper broader portion, the generally U-shaped lower narrower portion having a dimension corresponding to the dimension of a corresponding holding portion of the weight to be picked up, and the generally U-shaped upper broader portion having a dimension corresponding to the outer diameter of the weight to be picked up.

5. The automatic large-mass-weight handling system according to claim 1, wherein the automatic large-mass-weight handling system is an automatic handling system for large-mass-weights in the form of cubes, and the weight picking device comprises a weight holding portion which is also movable in the second horizontal direction that is perpendicular to both the first horizontal direction and the vertical direction.

6. The automatic large-mass-weight handling system according to claim 5, wherein the weight picking device comprises a base and a plurality of teeth protruding from the base in the second horizontal direction, the plurality of teeth being configured to be inserted into corresponding mating grooves, which are formed in a support structure for storing the large-mass-weights, for picking up a weight and storing a weight.

7. The automatic large-mass-weight handling system according to claim 1, wherein the weight picking device is provided with a sensing device for indicating that the weight holding portion reaches a predetermined target position, the sensing device being adapted to be cooperative with a counter sensing device provided on a structure for supporting large-mass-weights.

8. The automatic large-mass-weight handling system according to claim 1, wherein the driving device comprises one or more electric motors.

9. The automatic large-mass-weight handling system according to claim 1, wherein the control unit comprises a user inputting device for receiving target position information which is inputted by a user.

10. The automatic large-mass-weight handling system according to claim 9, wherein the control unit comprises a memory device in which information of weight storage positions that the weight picking device can reach is stored.

11. The automatic large-mass-weight handling system according to claim 10, wherein the target position information inputted by a user and the information of the weight storage positions are each in the form of a two-dimensional coordinate representing each weight storage position or a weight number corresponding to the two-dimensional coordinate that represents each weight storage position.

12. The automatic large-mass-weight handling system according to claim 9, wherein the control unit comprises an actuating device which actuates the driving device according to the target position information inputted by a user and the information of the weight storage positions.

* * * * *